(12) United States Patent
Anderson

(10) Patent No.: US 7,134,796 B2
(45) Date of Patent: Nov. 14, 2006

(54) XFP ADAPTER MODULE

(75) Inventor: Jon Anderson, Brielle, NJ (US)

(73) Assignee: Opnext, Inc., Eatontown, NJ (US)

( * ) Notice: Subject to any disclaimer, the term of this patent is extended or adjusted under 35 U.S.C. 154(b) by 0 days.

(21) Appl. No.: 10/925,901

(22) Filed: Aug. 25, 2004

(65) Prior Publication Data

US 2006/0045432 A1    Mar. 2, 2006

(51) Int. Cl.
*G02B 6/42* (2006.01)
*H04J 14/02* (2006.01)

(52) U.S. Cl. .......................... 385/88; 385/53; 385/134; 398/81

(58) Field of Classification Search .................. 385/53, 385/88, 92, 134; 398/81
See application file for complete search history.

(56) References Cited

U.S. PATENT DOCUMENTS

2005/0114663 A1* 5/2005 Cornell et al. .............. 713/168

2005/0114697 A1* 5/2005 Cornell et al. .............. 713/200
2005/0114710 A1* 5/2005 Cornell et al. .............. 713/201

OTHER PUBLICATIONS

"Vitesse Enables Immediate Deployment of XFP Module Standard", VITESSE Press Release, Camarillo, California, May 19, 2003, one page.*
"10 Gbps Design Solution Enables Immediate Deployment of the XFP Module Standard", XILINX Press Release, San Jose, California, Aug. 22, 2002, two pages.*

* cited by examiner

*Primary Examiner*—John D. Lee
(74) *Attorney, Agent, or Firm*—Kaplan Gilman Gibson & Dernier LLP

(57) ABSTRACT

A device which in an optical interface adapts XFP to a 300 pin MSA transponder socket, permitting replacement of 300 pin MSA transponders with an XFP module on an existing host circuit pack. The device performs dispersion compensation in a removable module, addressing issues of jitter, path length equalization, cross talk and electromagnetic compatibility. As deployed, the device presents at the optical interface the attributes of XFP, hence connected optical devices are "fooled" into reading a connection to XFP instead of the 300 pin MSA.

7 Claims, 2 Drawing Sheets

XFP ADAPTER MODULE

TECHNICAL FIELD

This invention relates to optical interfaces, and in particular to a device for adapting an "XFP" type interface to a 300 pin "MSA" type transponder socket and method for performing dispersion compensation in a removable module.

BACKGROUND OF THE INVENTION

In the past, optical interfaces were designed from discrete components. There have been many efforts to establish industrial standards in optical modules resulting in the formation of several Multi Source Agreements (MSA) including the 300 Pin MSA. This MSA specification consolidated this functionality into a 300 pin transponder. See, Reference Documents for 300 Pin 10 Gb and 40 Gb Transponders, available at www.300pinmsa.org, incorporated herein by reference. The industry has spent the last several years designing host circuit packs using MSA-based transponders.

Over the past few years, technological advances have resulted in smaller such devices such as XFP. XFP is currently the most advanced MSA providing compact 10 Gb/s modules at reduced costs with lower power consumption. The XFP device is a hot-pluggable small footprint serial-to-serial data-agnostic multirate optical transponder intended to support telecom (SONET OC-192 and G.709 "OTU-2") and datacom applications (10 Gb/s Ethernet and 10 Gb/s Fibre Channel). Nominal data rates range from 9.95 Gb/s, 10.31 Gb/s, 10.52 Gb/s, 10.70 Gb/s and the emerging 11.09 Gb/s. The XFP transponder supports all data encodings for these technologies, and may be used to implement single-mode or multi-mode serial optical interfaces at 850 nm, 1310 nm or 1550 nm. The XFP transponder design may use one of several different optical connectors. A full description of the XFP is contained in "XFP (10 Gigabit Small Form Factor Pluggable Module)", Revision 3.1, Apr. 2, 2003, available at www.xfpmsa.com/cgi-bin/msa.cgi, the entirety of which is incorporated herein by reference.

Currently, the XFP module is incompatible with existing 300 pin MSA transponders, and it is not practical to redesign existing circuit packs to employ the XFP module. Accordingly, what is needed is a module for adapting XFP to a 300 pin MSA transponder socket, enabling a transition from 300 pin MSA to XFP without circuit pack hardware and software redesign.

SUMMARY OF THE INVENTION

A device is presented which in an optical interface adapts XFP to a 300 pin MSA transponder socket, permitting replacement of 300 pin MSA transponders with an XFP module on an existing host circuit pack. The device performs electronic dispersion compensation in a removable module, addressing issues of jitter, path length equalization, cross talk and electromagnetic compatibility. As deployed, the device presents at the optical interface connection the attributes of XFP, hence connected optical devices are "fooled" into reading a connection to XFP instead of the 300 pin MSA.

The device provides for an alternative method of performing electronic dispersion compensation (EDC), namely performing EDC in a removable interface in an optical interface in a removable module.

DETAILED DESCRIPTION OF THE PREFERRED EMBODIMENTS

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

Figure 1:
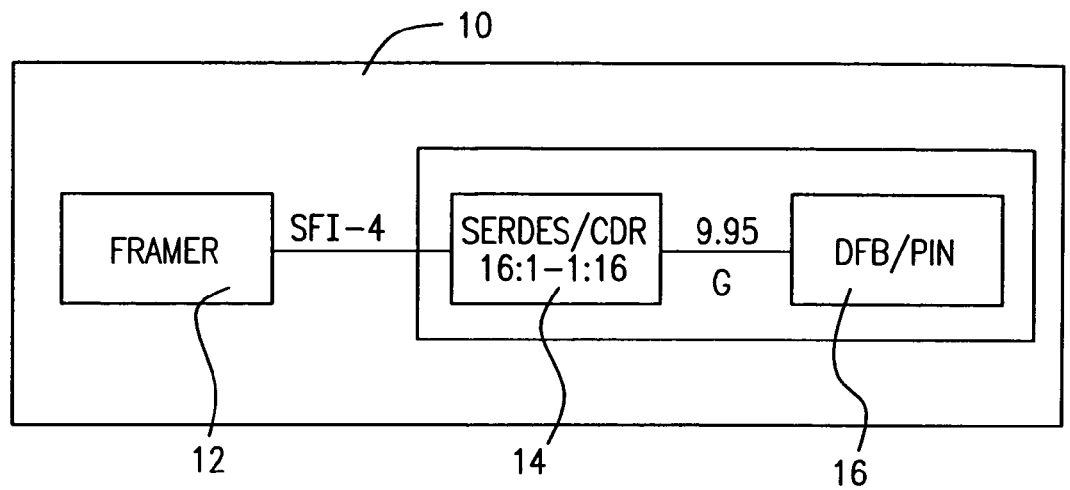
FIG. 1 depicts the existing 300 pin MSA.

Now referring to FIG. 1 an existing 300 pin MSA circuit pack 10 is depicted. Framer 12 is connected via SERDES Framer Interface (SFI) such as SFI-4 to SERDES (Parallel-to-Serial/Serial-to-Parallel)/CDR (Clock Data Recovery) chip 14 which is connected via a 9.95 Gb electrical interface with transponder 16.

The SERDES Framer Interface (SFI) defines an electrical interface between a SONET (Synchronous Optical Network)/SDH (Synchronous Digital Hierarchy) Framer and the high speed Parallel-to-Serial/Serial-to-Parallel (SERDES) logic. This permits the SERDES and Framer to be implemented in different speed technologies, allowing a cost-effective multiple chip solution for SONET/SDH Physical Layer Devices (PHY). The SFI-4 interface supports transmit and receive data transfers at clock rates locked to the actual line bit rate. It is optimized for the pure transfer of data. There is no protocol or framing overhead. Information passed over the interface is serialized by the SERDES and transmitted on the external link.

Figure 2:
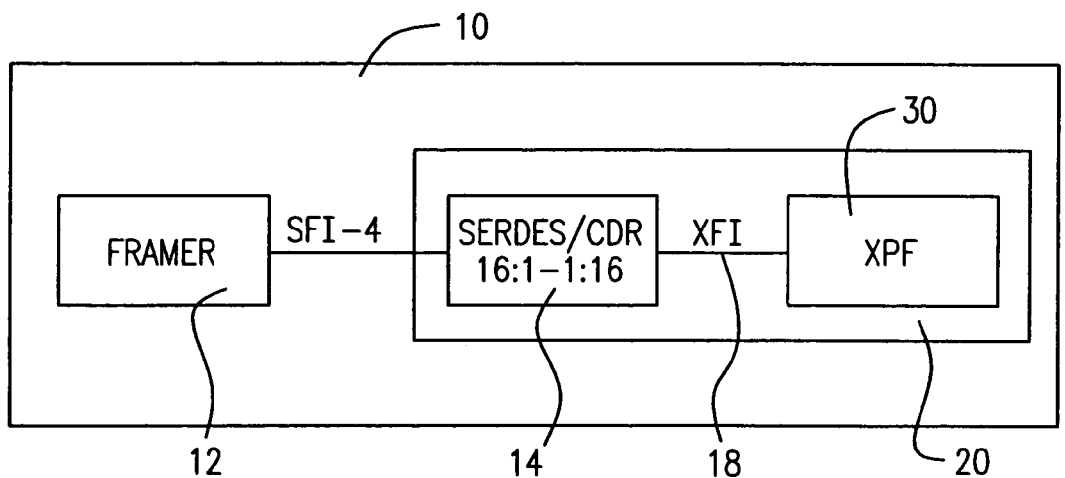
FIG. 2 depicts one embodiment of the present invention.

Now referring to FIG. 2, circuit pack 10 is depicted with the device 20 of the present invention. Framer 12 is connected via SFI to device 20 which comprises SERDES/CDR 14 connected via XFI electrical interface 18 with XFP assembly 30.

The XFI electrical interface 18 is the high-speed serial electrical interface between ASIC/SERDES and XFP modules with a nominal baud rate of 9.95–11.1 Gb/s. XFI connects a serial 9.95–11.1 Gb/s SERDES to a module over 300 mm of improved FR4 material or up to 200 mm of standard FR4 with one connector. The electrical interface is based on high speed low voltage AC coupled logic with a nominal differential impedance of 100 Ω. XFI was developed with the primary goal of low power and low electromagnetic interference (EMI). To satisfy this requirement the nominal differential signal levels are 500 mV p—p with edge speed control to reduce EMI.

Figure 3:
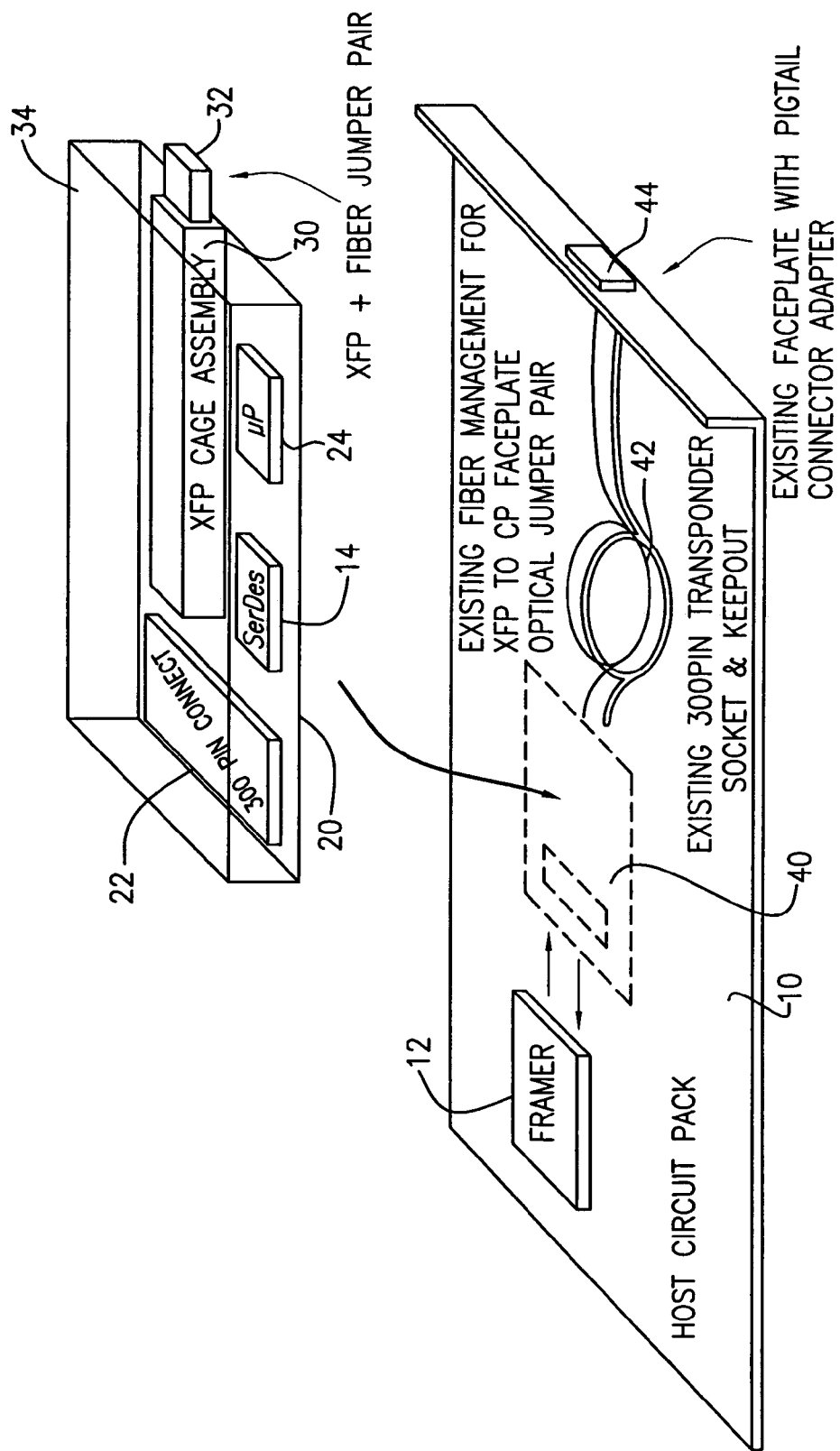
FIG. 3 depicts an embodiment of the present invention as used in conjunction with an existing host circuit pack.

Now referring to FIG. 3, in a preferred embodiment the device 20 of the present invention comprises a 300 pin connector 22, microprocessor 24, SERDES (Parallel-to-Serial/Serial-to-Parallel)/CDR (Clock Data Recovery) chip 14 and an XFP assembly 30 with a fiber jumper pair 32. In a preferred embodiment the device further comprises a case heat sink 34 and/or EMI shield (not shown).

The device 20 is pluggable in existing host circuit pack 10 in 300 pin MSA transceiver socket 40 including SFF (small form factor) specifications (2.2"×3") connecting to framer 12 and existing fiber management 42 and existing faceplate 44 having a pigtail connector adapter.

The XFP assembly 30 of device 20 is known in the art and comprises a transponder having an optical transmitter and receiver, i.e., a Transmitter Optical Subassembly (TOSA) and Receiver Optical Subassembly (ROSA) that can be employed in synchronous optical network/synchronous digital hierarchy (SONET/SDH) and dense wavelength division multiplexing (DWDM) systems, inter- and intra-office metropolitan rings, optical add/drop multiplexers, Internet Protocol (IP) switches and routers. The transponder combines a laser and photodetector with high-speed integrated circuits to perform functions such as clock synthesis, clock recovery and multiplexing and demultiplexing of 16×622 megabit per second channels.

The device 20 preferably further comprises programmable discrete alarms and monitors via the microprocessor 24, a I2C management interface option, and line and system loopback modes. The XFP assembly 30 in conjunction with the one-chip SERDES 14 results in reduced power consumption, typically less than 4 W. The single-chip SERDES 14 is optimized for VSR, SR and IR performance, and may optionally include the EDC functionality.

The device 20 addresses in a removable module the issues of jitter, path length equalization, cross talk and electromagnetic compatibility. One of the benefits of this adapter to the line card design is that all high-speed serial circuitry associated with the optical components is localized and separated from lower-speed, often parallel circuitry on the system line card. This simplifies both high and low-speed circuit design in that circuit cross-talk issues are eliminated, high-speed circuit path length equalization is more easily performed because of localization, hence high-speed signal jitter/wander performance is more easily managed In another embodiment, several circuit boards including optical interfaces may be installed into one rack, operating as one communications system. In such a case, there is usually a master controller or other processing system that includes memory for storing information indicative of the various optical interfaces contained on the various circuit boards. In an embodiment of the invention using the foregoing described techniques, any stored information may not indicate the actual optical interface of one or more particular circuit boards, as one or more such boards may include the adaptor described herein. Because such adapter is essentially transparent to the application, the stored information is unaware that some of the optical interfaces may actually be different from those indicated due to the presence of the aforementioned adaptor.

While the above describes the preferred embodiments of the invention, various modifications or additions will be apparent to those of skill in the art. Such modifications and additions are intended to be covered by the following claims.

The invention claimed is:

1. A system comprising a removable dispersion compensation device for use in an optical interface comprising a 300 pin connector, microprocessor, SERDES/CDR chip and an XFP assembly, the removable dispersion compensation device comprising a laser, a photodetector, and means for performing clock recovery, multiplexing, and demultiplexing, said system further comprising a system card to which said dispersion compensation device is connected, said system card having low speed parallel circuitry and said dispersion compensation device having high speed serial circuitry.

2. The device according to claim 1 further comprising a fiber jumper pair.

3. The device according to claim 1 further comprising a case heat sink.

4. The device according to claim 1 further comprising an EMI shield.

5. The device according to claim 1 adapted to be deployed in a 300 pin MSA transponder socket.

6. A method of converting an optical interface device comprising a 300 pin MSA transponder to an optical interface device comprising an XFP transponder comprising removing said 300 pin MSA transponder from a 300 pin MSA socket and inserting in said socket a device comprising a 300 pin connector, microprocessor, SERDES/CDR chip and an XFP assembly wherein the method further comprises implementing high speed serial circuitry on a separate module from low speed parallel circuitry.

7. A method of presenting at an optical interface connection of an existing 300 pin MSA host circuit pack the attributes of XFP, thereby deceiving optical devices connected thereto into reading a connection to XFP instead of the 300 pin MSA, comprising removing from a 300 pin MSA socket in said host circuit pack a 300 pin MSA transponder, inserting into said 300 pin MSA socket a device comprising a 300 pin connector, microprocessor, SERDES/CDR chip and an XFP assembly and connecting said device to existing fiber management of said host circuit pack, wherein said method further comprises implementing functionality to reduce jitter, and to equalize path length differences for signals on said device.

* * * * *